United States Patent [19]
Akasaka et al.

[11] Patent Number: 5,568,583
[45] Date of Patent: Oct. 22, 1996

[54] DISPERSION COMPENSATING OPTICAL FIBER FOR WAVELENGTH MULTIPLEX TRANSMISSION AND METHOD USING SAME

[75] Inventors: Youichi Akasaka; Ryuichi Sugizaki; Atsushi Umeda; Kunio Kokura, all of Ichihara, Japan

[73] Assignee: Furukawa Electric Co., Ltd., Tokyo, Japan

[21] Appl. No.: 527,083

[22] Filed: Sep. 12, 1995

[30] Foreign Application Priority Data

Sep. 13, 1994 [JP] Japan .................................. 6-244691

[51] Int. Cl.$^6$ ............................. G02B 6/02; H04B 10/00
[52] U.S. Cl. .......................... 385/123; 385/24; 385/126; 385/141; 359/115; 359/161
[58] Field of Search .............................. 385/15, 24, 123, 385/126, 127, 141, 142, 144; 359/115, 124, 161

[56] References Cited

U.S. PATENT DOCUMENTS

| | | | |
|---|---|---|---|
| 4,093,343 | 6/1978 | Hargrove | 385/123 |
| 4,261,639 | 4/1981 | Kogelnik et al. | 385/123 |
| 4,447,125 | 5/1984 | Lazay et al. | 385/123 X |
| 4,877,304 | 10/1989 | Bhagavatula | 385/123 X |
| 4,969,710 | 11/1990 | Tick et al. | 385/123 X |
| 5,013,131 | 5/1991 | Fotheringham | 385/126 |
| 5,131,069 | 7/1992 | Hall et al. | 385/142 |
| 5,191,631 | 3/1993 | Rosenberg | 385/123 |
| 5,218,662 | 6/1993 | Dugan | 385/123 |
| 5,224,183 | 6/1993 | Dugan | 385/24 |
| 5,278,931 | 1/1994 | Antos et al. | 385/126 |
| 5,430,822 | 7/1995 | Shigematsu et al. | 385/123 |
| 5,448,674 | 9/1995 | Vengsarkar et al. | 385/123 |
| 5,473,719 | 12/1995 | Stone | 385/123 |

FOREIGN PATENT DOCUMENTS

| | | | |
|---|---|---|---|
| 6-11620 | 1/1994 | Japan | 385/123 X |

OTHER PUBLICATIONS

Onishi, Masahi; Kanamori, Hiroo; Watanabe, Minoru, "Fabrication of Dispersion Compensating Fibers with Double Cladding Profile," Sep. 5, 1994, Incorporate Institute of Electronic Information and Communication Engineers of Japan.

Kanamori, Masashi; Onishi, Masahi; Fukuda, Chie; Yokota, Hiroshi, "Double–Cladding Dispersion–Compensating Fiber," Mar. 10, 1994, Incorporate Institute of Electronics and Communication Engineers of Japan.

Vengsarker, Ashish M.; Reed, W. A., "Dispersion–Compensating Single Fibers: Efficient Designs for First–and–Second–order Compensation," Jun. 1, 1993, Optical Society of America.

Kuwaki, Nobuo; Ohashi, Masaharu; Uesugi, Naoshi, "Dispersion and Bending Loss Sensitivities of W–Type Dispersion–Modified Single–Mode Fibers", Oct. 25, 1988, The Institute of Electronics, Information and Communication Engineers.

(List continued on next page.)

*Primary Examiner*—Brian Healy
*Attorney, Agent, or Firm*—Robert Platt Bell & Associates, P.C.

[57] ABSTRACT

The present invention is intended to provide a dispersion compensating optical fiber for wavelength division multiplex optical communication. A refractive index distribution of the dispersion compensating optical fiber is set to be W-shaped, an outside of a core is formed as an internal clad layer and the outside of the internal clad layer is formed as an outermost clad layer made of pure silica. Germanium for raising the refractive index by 2.8% in a specific refractive index difference is doped in the core, and fluorine is uniformly doped in the internal clad layer so that the refractive index is reduced by 0.45% in the specific refractive index difference. A diameter ratio of the core and the internal clad layer is set to be in a range of 1:1.5 to 1:4.0, a wavelength dispersion slope is set to be in a negative area, and dispersion is controlled to a negative high dispersion structure of −100 ps/km-nm or under.

10 Claims, 5 Drawing Sheets

OTHER PUBLICATIONS

Okamoto, K.; Edahiro, T.; Kawana, A.; Miya, T.; "Low Dispersion Single–Mode Optical Fibers over a Wide Spectral Range," Jan. 24, 1980, Incorporate Institute of Electronics and Communication Engineers of Japan.

Belov, A. V. et al., "The Realization of Broad–Band Dispersion Compensation using the Multicladding Waveguide Structure", 19th European Conference on Optical Communication Proceedings, vol. 2, pp. 349–352, Sep. 12, 1993.

Vengsarkar, A. M. et al., "Fundamental–mode Dispersion–compensating Fibers: Design Considerations and Experiments," OFC '94 Technical Digest, ThK2, pp. 225–227, Feb. 20, 1994.

Onishi, M. et al., "Dispersion Compensating Fibers with Low Attenuation", Technical Report of Institute of Electronics, Information and Communication Engineers, pp. 52–56 and one page Abstract in English, Aug. 27, 1993.

DISPERSION COMPENSATING OPTICAL FIBER FOR WAVELENGTH MULTIPLEX TRANSMISSION AND METHOD USING SAME

FIELD OF THE INVENTION

The present invention relates to dispersion compensating optical fiber for wavelength division multiplexed transmission to compensate wavelength dispersion in a multiplexed transmission, and more particularly, relating to optical transmission signals having a plurality of wavelengths at or about 1550 nm.

BACKGROUND OF THE INVENTION

A 1300 nm zero dispersion fiber network is known to be used providing highly reliable optical communications. At a receiving side of a network zero dispersion of optical signals having a wavelength of 1300 nm is obtainable.

As of late, wavelength division multiplex communications for transmitting optical transmission signals (optical pulse transmission signals) having a plurality of wavelengths is being implemented by using this existing 1300 nm zero dispersion fiber network. In wavelength division multiplex communication using a wavelength of approximately 1550 mm through the existing 1300 mn zero dispersion transmission network, wavelength dispersion of approximately 17 ps/km-nm occurs causing a disturbance in long range transmission. Generally, wavelength dispersion includes positive dispersion and negative dispersion; negative dispersion refers to a phenomenon that, as the wavelength becomes larger, the group index of the optical transmission fiber lessens and the group velocity of the transmission signal increases and the pulse width increases in response to this increase of the group velocity; positive dispersion refers to a phenomenon that, as the wavelength increases, the group index of the optical transmission fiber increases and the group velocity of the transmission signal lessens and the pulse width increases in response to this decrease of group velocity.

An ordinary existing 1300 nm zero dispersion transmission network has a dispersion of approximately 17 ps/km-nm at a wavelength of approximately 1500 nm as described above. In a long range transmission of, for example, 100 km distance, there is a problem that dispersion of approximately 1700 ps/km-nm occurs at the receiving side of an optical transmission and, even though high density/high speed communication is attempted by minutely dividing the wavelength at approximately 1550 nm, a signal of one side wavelength is superposed with a signal of the other side wavelength and separation of signals is difficult since dispersion is large as described; therefore due to this overlapping of adjacent channels, optical communication performance is worsened.

In the prior art, a dispersion compensating optical fiber for compensating a quantity of chromatic dispersion of a specific wavelength is inserted into the optical transmission path to prevent the increase in the quantity of chromatic dispersion as is described above.

This type of dispersion compensating optical fiber has negative dispersion and the increase of the quantity of dispersion of a specific wavelength in an optical transmission is lessened by offsetting positive dispersion of a 1300 nm zero dispersion transmission network with negative dispersion by utilizing this dispersion compensating optical fiber.

Dispersion compensating optical fiber includes five types of refractive index profiles as disclosed in Japanese Patent Application Disclosure HEI 6-11620. These five types of refractive index profile are shown in FIG. 5. In the refractive index distributions shown in FIGS. 5a and 5b, the dispersion slopes (the derivative of dispersion with respect to wavelength) respectively have a positive value and, in the use of such dispersion compensating fiber, dispersion compensation can be carried out for a specific wavelength; however this dispersion compensating optical fiber is unsuitable for other wavelengths as a compensation optical fiber for wavelength division multiplex transmission since the quantity of dispersion increases with wavelength. The three types of optical fibers relating to FIGS. 5c to 5e may have a refractive index having a negative dispersion slope. Though the W-shaped refractive index profile shown in FIG. 5c has long been examined, conventional W-shaped optical fiber has been able to provide a negative dispersion slope but has required an extremely long fiber length necessary for a dispersion compensation since the quantity of negative dispersion of the conventional W-shaped optical fiber has been small, and therefore it has been unsuitable for practical use. It is better to reduce the diameter of the core to increase the quantity of negative dispersion; if the core diameter of the optical fiber is reduced and the quantity of negative dispersion is increased, the dispersion slope in the W-shaped refractive index profile is inverted from a negative slope to a positive slope and therefore the W-shaped optical fiber is unsuitable to wavelength multiplex division transmission.

It is an object of the invention to overcome the above-described problem of the prior art by providing a structure capable of simultaneously having a negative dispersion slope with an effective size and a negative dispersion with an appropriate magnitude in the W-shaped refractive index distribution to provide a dispersion compensating optical fiber for wavelength division multiplex transmission which enables compensation of dispersion in a wide range of wavelengths at or about approximately 1550 nm, and wavelength division multiplex transmission by using the existing 1300 nm zero dispersion transmission network.

A dispersion compensating optical fiber for wavelength division multiplex communication wherein wavelength dispersion $\sigma$ in range of $a0 \leq a \leq a1$ is controlled in a range of $\sigma \leq -100$ ps/km-nm when it in assumed that a core radius with which a wavelength dispersion slope ($d\sigma/d\lambda$) is zero is a0 and a core radius with which the wavelength dispersion slope ($d\sigma/d\lambda$) is $-0.28$ ps/km-nm$^2$ is a1 in a that a core radius of an optical fiber is a, wavelength dispersion is $\sigma$, and a wavelength of optical transmission signal is $\lambda$.

The present invention is adapted as described below to attain the above object. Specifically, the present invention is characterized in that the wavelength dispersion $\sigma$ in range of $a0 \leq a \leq a1$ is set to be within in a range of $\sigma \leq -100$ ps/km-nm when it in assumed that a core radius in a case that the wavelength dispersion slope ($d\sigma/d\lambda$) is zero is a0 and a core radius in the case that the wavelength dispersion slope ($d\sigma/d\lambda$) is 0.28 ps/km-nm$^2$ is a 1 if the core radius of an optical fiber is a, wavelength dispersion is $\sigma$, and a wavelength of optical transmission signal is $\lambda$.

The present invention is also characterized in that the refractive index structure of the above optical fiber has the W-shaped refractive index profile, an internal clad layer is formed outside the core, an outermost clad layer is formed on the outside of the internal clad layer, a dopant for reducing the refractive index is doped in the internal clad layer so that a specific refractive index difference is −0.45%, the outermost clad layer being made of pure silica and the dopant for raising the refractive index is doped in the core so that the specific refractive index difference is +2.8%, the diameter ratio of the core to the internal clad layer is determined to be within the range of 1:1.5 to 1:4.0, the dispersion having a negative slope at a wavelength of about 1550 nm, and the wavelength dispersion at optical wavelengths of about 1550 nm is smaller than −100 ps/km-nm and larger than −170 ps/km-nm in a small range wherein the core diameter is larger than 2.1 μm and smaller than 2.3 μm.

In the above configuration according to the present invention, if the dispersion compensating optical fiber for wavelength division multiplex transmission according to the present invention is inserted into, for example, an existing 1300 nm zero dispersion transmission network and wavelength division multiplex communication is carded out with at a wavelength of approximately 1550 nm, optical signals of respective wavelengths which have reached the terminal through the 1300 nm zero dispersion transmission network have large quantities of wavelength dispersion. However, since the dispersion compensating optical fiber according to the present invention simultaneously has the high negative chromatic dispersion and a negative dispersion slope, this offsets a large unwanted positive dispersion quantity, which occurs through the 1300 nm zero dispersion transmission network; Effectively optical signals of respective wavelengths which have passed through the dispersion compensating optical fiber according to the present invention have dispersion values almost equal to zero. Consequently, separation of signals with respective wavelengths is certainly carried out at the receiving side to enable high density/high speed wavelength division multiplex communication in high reliability.

The present invention provides a new dispersion compensating optical fiber which has a negative dispersion slope and a negative high dispersion, that effectively offsets large dispersion quantities caused in the optical transmission path and receives signals with small-wavelength dispersion at the receiving side by utilizing optical fiber having high negative dispersion according to the present invention.

Thus the reliability of high density/high speed wavelength division multiplex communication can be substantially raised.

The dispersion compensating optical fiber according to the present invention has negative high dispersion and, even when large positive dispersion occurs in optical transmission signals which have passed through the optical transmission path, the positive dispersion can be compensated with a short length of optical fiber. Accordingly, the dispersion compensating optical fiber can be housed in a small compact package and therefore excellent in practical use.

In addition, in the wavelength division multiplex communication using the wavelength of approximately 1550 nm with an existing 1300 nm zero dispersion transmission network, wavelength dispersion of transmission optical signals of various wavelengths can be effectively offset and compensated at the receiving side by inserting the dispersion compensating optical fiber according to the present invention into the optical transmission path, thereby achieving high density/high speed wavelength division multiplex communication with high reliability at wavelength of or about approximately 1550 nm.

The optical fiber is subject to a condition for effective propagation of light. This light propagating condition depends on the effective refractive index ($\beta/k$), where $\beta$ is a propagation constant within the waveguide and k is the number of waves in the media space.

In the optical fiber having the W-shaped refractive index profile, the effective refractive index of light signals depend on the values of specific refractive index difference $\Delta+$ of the core and specific refractive index difference $\Delta-$ of the internal clad and it is necessary to find an optimum combination of these specific refractive index differences $\Delta+$ and $\alpha-$.

According to the studies of the present inventor, the propagation conditions tend to be satisfied with a larger specific refractive index difference $\Delta+$ of the core and a smaller specific refractive index difference $\Delta-$ of the internal clad and particularly the optimum propagation conditions are obtained —from a— combination of the specific refractive index difference $\Delta+$ of +2.8% of the core and the specific refractive index difference $\Delta-$ of 0.45% of the internal clad. The light propagation performance of the optical fiber deteriorates as the above refractive index differences deviate from the optimum propagation conditions. for example, in case of the optical fiber with $\Delta+=+2.8\%$ and $\Delta-=-0.7\%$, $\Delta-$ is too large to deteriorate and in case of the optical fiber with $\Delta+=2.1\%$ and $\Delta-=-0.35\%$, the -light propagation performance similarly deteriorates since $\Delta+$ is excessively small.

As in the present invention, the optimum refractive index for propagation of light can be obtained by applying $\Delta+=+2-8\%$ and $\Delta-=-0.45\%$.

BRIEF DESCRIPTION OF THE DRAWINGS

These and other objects and advantages of this invention will become more apparent and more readily appreciated from the following detailed description of the exemplary embodiments of the invention taken in conjunction with the accompanying drawings, of which.

DETAILED DESCRIPTION

Figure 1:
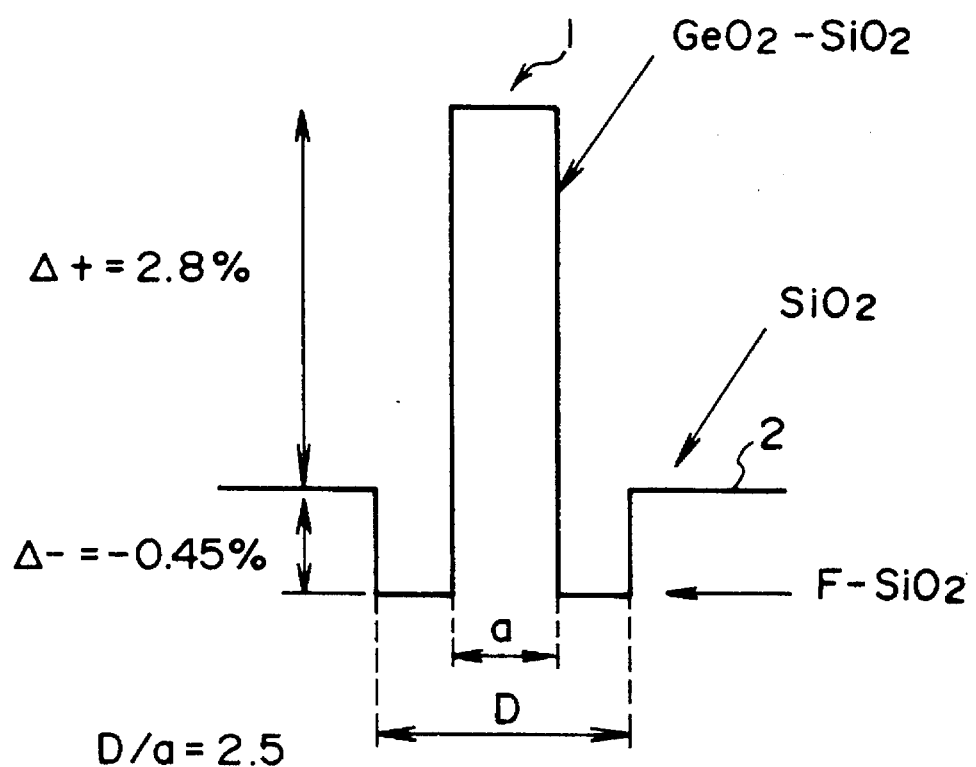
FIG. 1 is an illustration of the refractive index profile of a dispersion compensating optical fiber for wavelength division multiplex communication according to the present invention.

The embodiments of the present invention are described below referring to the drawings. FIG. 1 shows a structure of an embodiment of a dispersion compensating optical fiber for wavelength division multiplex transmission according to the present invention.

The dispersion compensating optical fiber of the present embodiment has a W-shaped refractive index profile and germanium Ge for raising the refractive index so that $\Delta+=2.8\%$ is obtained as a specific refractive index difference $\Delta$ is doped in the core 1. A clad layer 2 is formed outside the core I and fluorine F for reducing the refractive index so that the value of the specific refractive index difference Δ is −0.45% is uniformly doped in this clad layer 2. An outermost clad layer (not shown) made of pure silica is formed on the outside of the internal clad layer 2. The diameter ratio a/D of the core and the internal dad layer is set in the range of 1:1.5 to 1:4.0.

Figure 4:
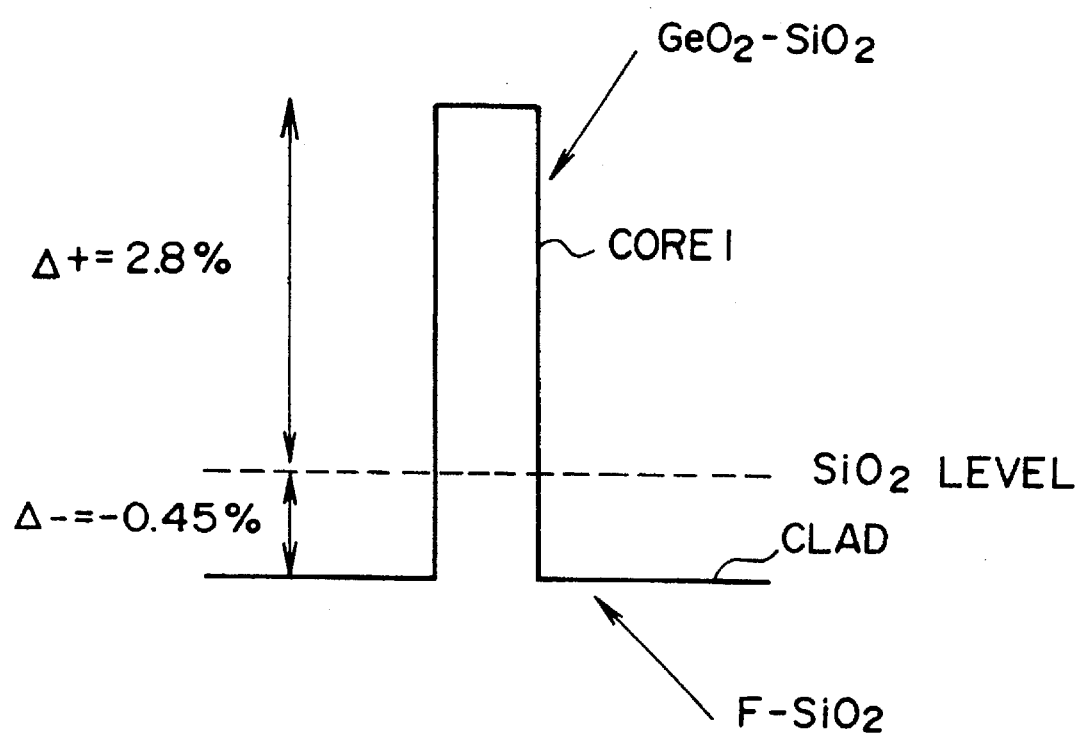
FIG. 4 is an illustration of a conventional typical simple step type optical fiber construction; and, FIG. 5 is illustrations of five types of refractive index profile disclosed in the Japanese Patent application Disclosure HEI. 6-11620.
Figure 5A:
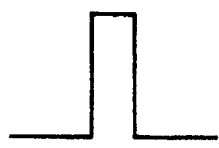
Figure 5B:
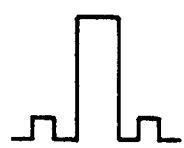
Figure 5C:
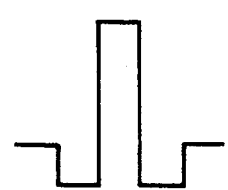
Figure 5D:
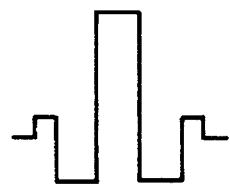
Figure 5E:
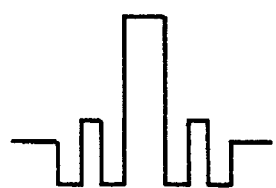

FIG. 4 shows a conventional typical simple step type optical fiber structure as a comparative example. In this comparative example of the optical fiber, germanium for raising the refractive index so that the specific refractive index difference of 2.8% is obtained is doped in the core 1 and fluorine F for reducing the refractive index to obtain the specific refractive index difference of −0.45% is uniformly doped in the clad layer on the outside of the core 1.

Dispersion values σ and dispersion slopes δ with respect to respective core diameters in the optical fiber structure shown in FIG. 1 are calculated with the diameter ratio of the core and the internal clad layer as a parameter as shown in Tables 1 to 3.

TABLE 1

| Core Diameter | Dispersion Value | Dispersion Slope |
| --- | --- | --- |
| 1.6 | −262 | +0.86 |
| 1.7 | −267 | +0.97 |
| 1.8 | −248 | +0.92 |
| 1.9 | −220 | +0.61 |
| 2.0 | −185 | +0.29 |
| 2.1 | −157 | 0.00 |
| 2.2 | −127 | −0.19 |
| 2.3 | −107 | −0.24 |
| 2.4 | −88 | −0.26 |
| 2.5 | −71 | −0.27 |
| 2.6 | −55 | −0.28 |
| 2.7 | −41 | −0.25 |
| 2.8 | −36 | −0.23 |
| 2.9 | −27 | −0.20 |
| 3.0 | −18 | −0.18 |
| 3.1 | −5 | −0.14 |
| 3.2 | +3 | −0.11 |

TABLE 2

| Core Diameter | Dispersion Value | Dispersion Slope |
| --- | --- | --- |
| 1.83 | −208.6 | +0.374 |
| 2.00 | −170.15 | +0.099 |
| 2.17 | −129.97 | −0.083 |
| 2.33 | −93.94 | −0.161 |
| 2.5 | −64.44 | −0.193 |
| 2.67 | −40.6 | −0.188 |

TABLE 3

| Core Diameter | Dispersion Value | Dispersion Slope |
| --- | --- | --- |
| 1.9 | −211.6 | +0.4498 |
| 2.0 | −190.9 | +0.3028 |
| 2.1 | −166.9 | +0.1621 |
| 2.2 | −144.05 | −0.056 |
| 2.3 | −101.15 | −0.1612 |
| 2.4 | −40.6 | −0.188 |
| 2.5 | −83.07 | −0.177 |

Equations for obtaining the dispersion value s and the dispersion slope d are as given below.

$$\sigma = (K/c)\,dM2/dK + (K/c)\,(d\,(M1-M2)/dK)\,d(V\cdot b)/dV + \{(M1-M2)/c\}V\,d2(V\cdot b)/dV^2 \quad (1)$$

$$\delta = d\sigma/d\lambda \quad (2)$$

The symbols used in the equations denote as follows. c: Velocity of light, K: the wave number in the media space, n1: Refractive index of the core, n2: Refractive index of the external clad layer, A: Specific refractive index difference between the core and the external clad layer, $V = (K \cdot n1 \cdot a(2\Delta))^{1/2}$, a: Core radius, M1: $d(K \cdot n1)/dK$, M2: $d(K \cdot n2)/dK$, b: Normalized variable.

Table 1 shows the results of calculations in the case that the diameter ratio of the core and the internal clad layer is 1:2.5, Table 2 shows the results of calculations in the case that the diameter ratio of the core and the internal dad layer is 1:1.5, and Table 3 shows the results of calculations in the case that the diameter ratio of the core and the internal clad layer is 1:4.0.

As known from these results of the calculations, the dispersion is inverted from having a the positive slope to a negative slope with a certain core diameter as the border. The dispersion is inverted with the core diameter of 2.1 μm as the border in the data shown in Table 1, the dispersion slope is inverted with the core diameter between 2.00 and 2.1 μm as the border in the data shown in Table 2, and the dispersion slope is inverted with the core diameter between 2.1 and 2.2 μm as the border in the data shown in Table 3. Accordingly, the structure of the dispersion compensating optical fiber having a dispersion slope in the negative range and negative high dispersion can be specified according to these calculation data.

The present embodiment with a key emphasis on this point is intended to provide a dispersion compensating optical fiber having a negative dispersion slope and a negative high dispersion. The present embodiment is also intended to obtain a dispersion compensating optical fiber whose wavelength dispersion σ becomes σ≦−100 ps/km-nm when it in assumed that a core radius in a case that the wavelength dispersion Mope (dσ/dλ) is zero is a0 and a core radius in the case that the wavelength dispersion slope (dσ/dλ) is 0.28 ps/km /nm² is al if the core radius of an optical fiber is a, wavelength dispersion is σ, and a wavelength of optical transmission signal is 80 . The conditions are satisfied respectively with the core diameter of 2.1 to 2.3 in the data shown in Table 1, the core diameter of 2.17 μm in the data shown in Table 2, and the core diameter of 2.2 to 2.4 μm in the data shown in Table 3.

There are some appreciable differences between the results of calculations shown in the above tables and the actual values of measurement of the actually manufactured dispersion compensating optical fiber. For example, the actually measured values of the actually manufactured dispersion compensating optical fiber with the diameter ratio of the core diameter and the internal clad layer of 1:2.5 are such that the dispersion value is −163.3 ps/km-nm and the dispersion slope is −0.129 ps/km-nm² in case of the core diameter of 2.124 μm and the dispersion value is −152 ps/km-nm and the dispersion slope is −0.249 ps/km-nm² in case of the core diameter of 2.184 μm. An optical fiber having the negative high dispersion that is −100 ps/km-nm or less in the range of the negative dispersion slope can be made by referring to the values obtained from calculations (while adjusting the data as required with the calculated values as the targets).

Figure 2:
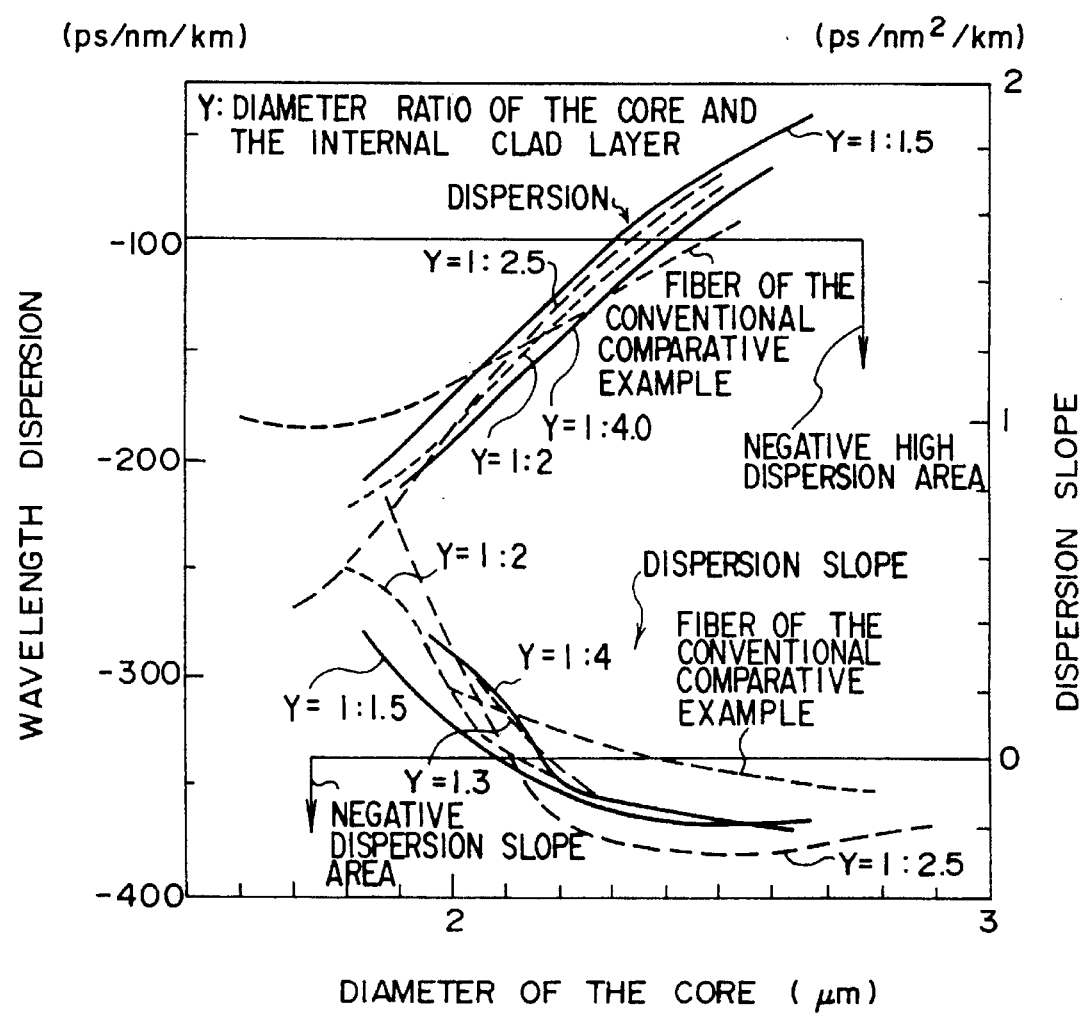
FIG. 2 is a graph showing dispersion slopes of the dispersion compensating optical fiber according to the present embodiment and various measurement data.

FIG. 2 shows the results of actual measurements of the dispersion slopes and the dispersion values in reference to the core diameters of the dispersion compensating optical fiber in the present embodiment with the diameter ratio of the core and the internal clad layer as a parameter. According to the data of actual measurements, the range of the core diameter, where negative high dispersion with the wavelength dispersion of −100 ps/km-nm or less occurs in the range that the dispersion slope is zero or under, is obtained, the diameter of the internal clad layer is determined by specifying the core diameter, and the dispersion compensating optical fiber provided with a fiber structure shown in FIG. 1 and an excellent dispersion compensating function can be obtained. The data of actual measurements of the conventional comparative example fiber shown in FIG. 4 is shown in FIG. 2 for reference.

By inserting the dispersion compensating optical fiber having a chromatic dispersion with a negative slope and the negative high dispersion with wavelength dispersion of −100 ps/km-nm or less into the optical transmission path having positive dispersion, a large positive dispersion which is caused in the optical transmission path can be effectively compensated and the dispersion of respective wavelengths can be compensated to a small value (preferably, dispersion of almost zero) at the receiving side. Though the ordinary optical transmission path has a positive dispersion slope, the dispersion compensating optical fiber having the negative dispersion slope of the present embodiment can be used to obtain an effect that the variations of wavelength dispersion of respective wavelengths at the receiving side can be prevented and wavelength dispersion can be limited to the range of small variations.

In wavelength multiplex division transmission at approximately 1550 nm with the existing 1300 nm zero dispersion optical fiber network, an optical fiber having the negative high dispersion in which the dispersion value at the wavelength of 1550 nm is smaller than −100 ps/km-nm is selected by setting the conditions for selecting the dispersion compensation optical fiber in a range where the chromatic dispersion has a negative slope at approximately 1550 nm and the core diameter is larger than 2.1 µm and smaller than 2.3 µm. Dispersion of the optical transmission path can be effectively compensated and optical signals having a small dispersion with respect to wavelengths can be readily received by inserting this optical fiber as the dispersion compensating optical fiber into the existing 1300 nm zero dispersion optical fiber network and carrying out wavelength division multiplex transmission using the wavelength of approximately 1550 nm.

Figure 3:
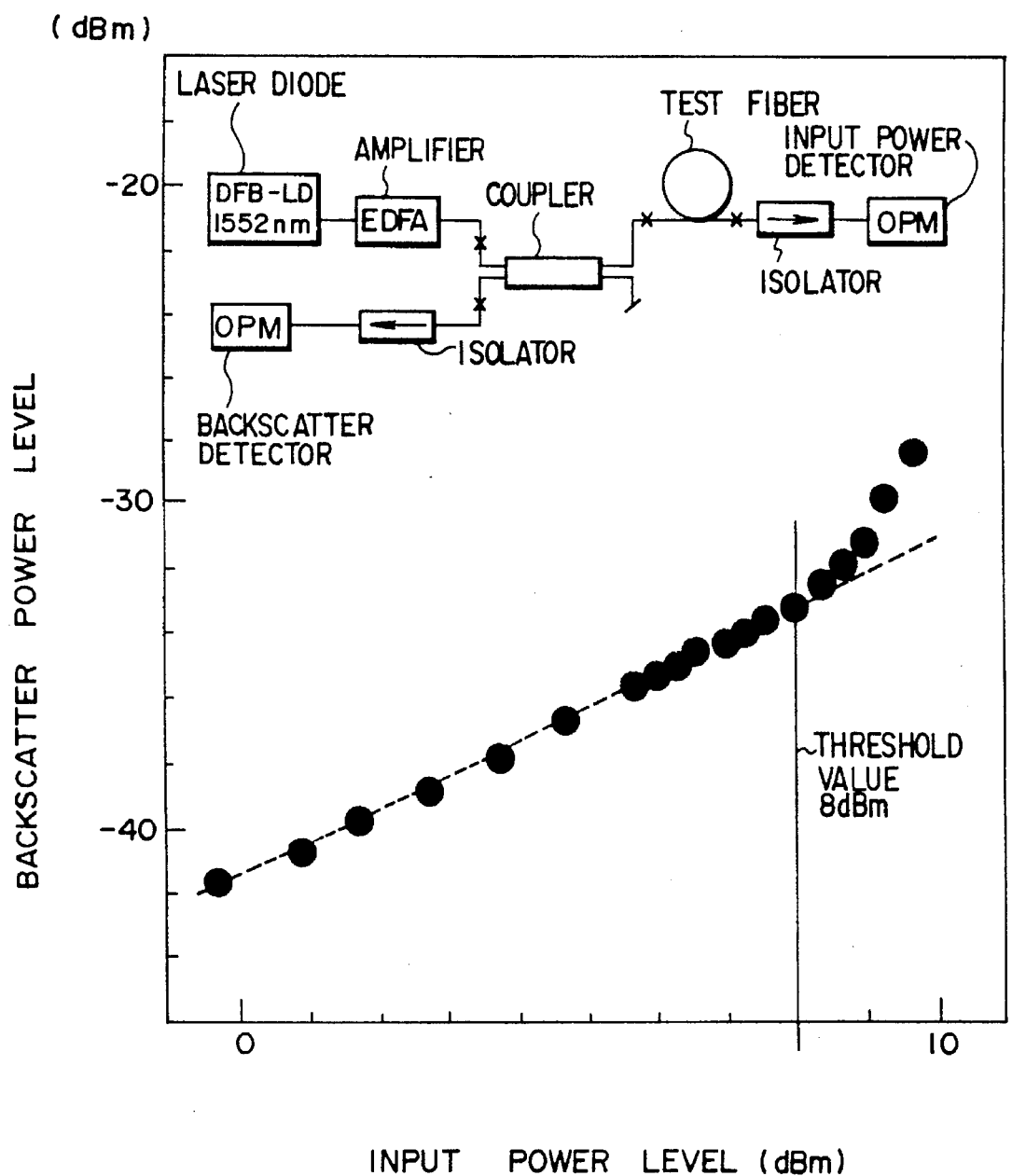
FIG. 3 is a graph showing data of measurements of stimulated Brillouin scattering of the dispersion compensating optical fiber according to the present embodiment.

FIG. 3 shows the data of actual measurement of the induced Brillouin scattering of the dispersion compensating optical fiber made in the present embodiment. The measuring apparatus for this induced Brillouin scattering is shown in the graph for reference. In FIG. 3, the horizontal axis indicates the input power level and the vertical axis indicates the power level of the backscatter. As known from the experimental data, the induced Brillouin scattering occurs when the input power level is 8 dBm, and the threshold value of 8 dBm at which the induced Brillouin scattering will occur is similar to that of the conventional typical dispersion compensating optical fiber having the positive dispersion slope. It is also known that the induced Brillouin scattering of the dispersion compensating optical fiber in the present embodiment is not more worsened than the conventional, the input power can be sufficiently increased in a range where the backscatter is not caused, and practical applicability is fully satisfied.

Numerous other emobidiments may be envisaged without departing from the spirit and scope of the invention.

What we claim is:

1. A dispersion compensating optical fiber for wavelength division multiplexing communication comprising:

a core, having a radius 'a', wherein a0<a≦a1, the optical fiber having chromatic dispersion σ≦−100 ps/km-nm, and having a dispersion slope (dσ/dλ) of zero when the core radius is a0 and the dispersion slope (dσ/dλ)=− 0.28 ps/km-nm² when the core radius is a1.

2. A dispersion compensating optical fiber for wavelength division multiplexing communication comprising:

a core having a diameter 'a', wherein 2.1 µm<a≦2.6µm, the optical fiber having chromatic dispersion σ≦−100 ps/km-nm is this frequency independent, and having a dispersion slope (dσ/dλ) that is substantially between zero and −0.28 ns/km nm² the dispersion slope dσ/dλ approaching zero as the value of a is selected to be a value approaching 2.1 µm.

3. A dispersion compensating optical fiber as defined in claim 2, wherein the optical fiber has a W-shaped refractive index profile.

4. A dispersion compensating optical fiber as defined in claim 3, wherein the optical fiber includes:

an internal clad layer formed on an outside of the core; and, having an outermost clad layer formed on the outside of the internal clad layer, the internal clad layer being doped with a dopant for reducing the refractive index of the internal clad layer, the outermost clad layer is made of pure silica, and wherein the core is doped to raise the refractive index in the core.

5. A dispersion compensating optical fiber as defined in claim 4, wherein the internal clad layer is doped with a dopant that will reduce the refractive index of the internal clad layer so that a refractive index difference between the inner clad layer and the other clad layer is −0.45%.

6. A dispersion compensating optical fiber as defined in claim 4, wherein the core is doped with a dopant that will raise the refractive index in the core such that the refractive index difference between the core and the outermost clad layer is +2.8%.

7. A dispersion compensating optical fiber as defined in claim 6, wherein the core is doped with germanium.

8. A dispersion compensating optical fiber as defined in claim 5, wherein the internal clad layer is doped with fluorine.

9. A dispersion compensating optical fiber as defined in claim 7, wherein the diameter ratio of the core and the internal clad layer lies within a range of 1:1.5 to 1:4.0.

10. A method of compensating for unwanted positive dispersion in an optical transmission path, comprising the steps of:

providing an optical fiber having a core diameter larger than 2.1 µm and smaller than 2.3 µm, the optical fiber having a dispersion of between −100 ps/nm-km and −170 ps/km-nm at a transmission wavelength of approximately 1550 nm, the dispersion slope dσ/dλ being a negative value; and, coupling the optical fiber to the optical transmission path.

* * * * *

UNITED STATES PATENT AND TRADEMARK OFFICE
CERTIFICATE OF CORRECTION

PATENT NO. : 5,568,583
DATED : October 22, 1996
INVENTOR(S) : Akasaka et al

It is certified that error appears in the above-indentified patent and that said Letters Patent is hereby corrected as shown below:

Column 4, line 10  "$\alpha$" should read --$\Delta$--

Column 4, line 30: "2-8%" should read --2.8%--

Column 6, line 35: "Mope" should read --slope--

Signed and Sealed this

Ninth Day of September, 1997

BRUCE LEHMAN

*Attest:*

*Attesting Officer*   Commissioner of Patents and Trademarks